July 24, 1951 N. G. HOVLID ET AL 2,561,573
TIRE CURING RIM STRUCTURE
Filed Dec. 8, 1947 2 Sheets-Sheet 2
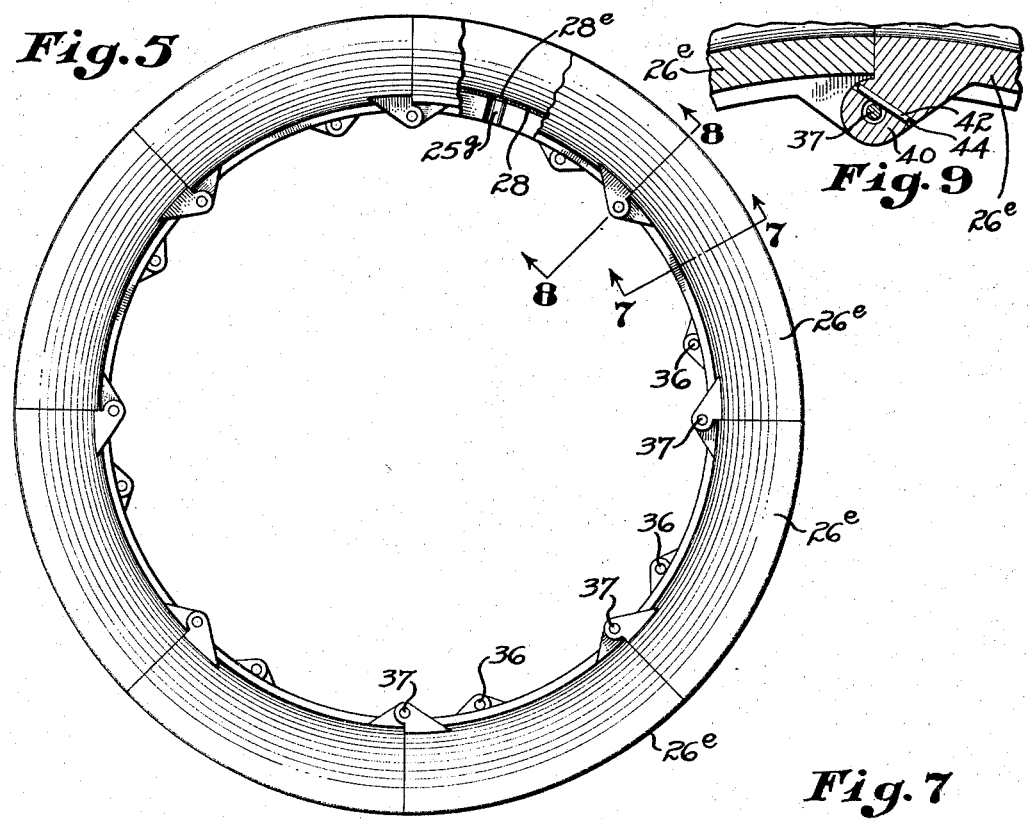
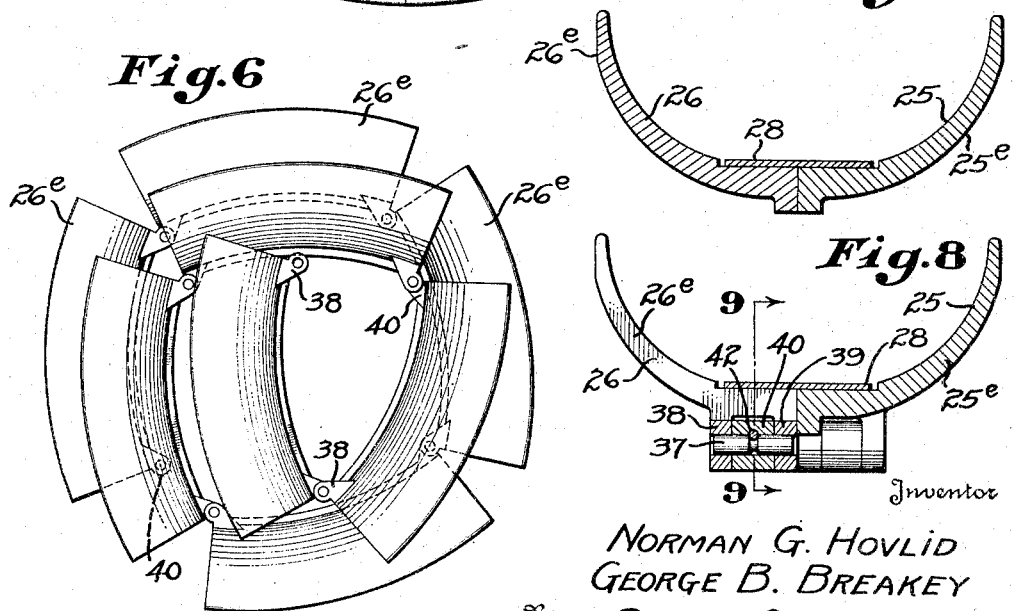
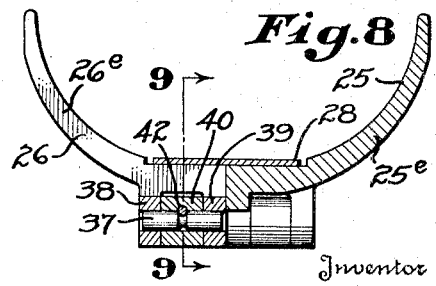
Inventor
NORMAN G. HOVLID
GEORGE B. BREAKEY
By Lyon & Lyon
Attorneys Patented July 24, 1951

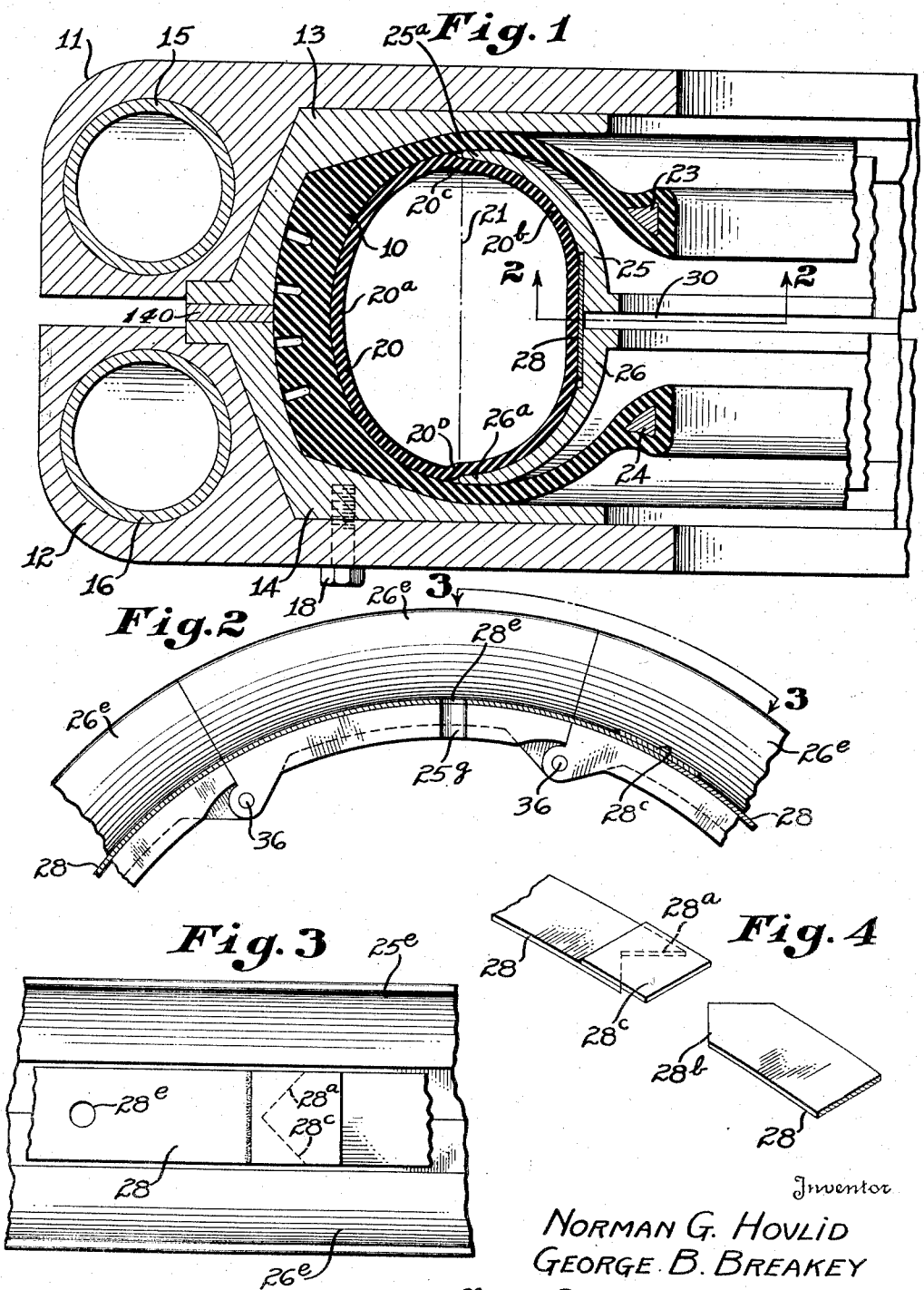

2,561,573

UNITED STATES PATENT OFFICE 2,561,573

TIRE CURING RIM STRUCTURE

Norman G. Hovlid, Torrance, and George B. Breakey, Los Angeles, Calif., assignors to American Tire Machinery, Inc., Muncie, Ind., a corporation of California Application December 8, 1947, Serial No. 790,378

6 Claims. (Cl. 18—18)

The present invention relates to vulcanizing apparatus and more specifically to apparatus useful in retreading worn pneumatic tires.

It has been customary in retreading tires of different widths to utilize a different inside collapsible rim structure corresponding to each different width of pneumatic tires whereby the inner conventional air bag is properly pressed against the tire and the tire is properly pressed against the conventional matrix. Where in accordance with such practice, it is necessary to stock many different sized curing rims for satisfactory operation in a plant arranged for retreading tires of all widths. Consequently, the invested capital in the plant is relatively large and adequate storage space must be provided for the different rim structures. Usually, when such prior art rim structures are used in retreading tires of sizes different from which they were designed for, objectionably large forces are exerted on the rim structure to deform it in an objectionable manner. This is partially so since the inner extending ends of such rim structure upon which a relatively large pressure is exerted by the air bag are supported as a cantilever.

It is therefore an object of the present invention to provide an improved collapsible curing rim structure which is useful in retreading tires of many different sizes, a feature of the rim structure being that the rim structure is self-adjusting to accommodate itself for its intended purpose.

Another object of the present invention is to provide an improved self-adjusting rim structure which is of light weight, and fully collapsible.

Still another object of the present invention is to provide an improved tire curing rim structure having two halves which is self-adjusting to serve efficiently for its intended purpose and which may be easily and quickly mounted and dismounted with relationship to the associated air bag and tire.

Yet another object of the present invention is to provide an improved self-adjusting tire curing rim structure.

Yet a further object of the present invention is to provide an improved tire curing rim structure made in separate halves, each half having equal arched segments arranged so that it may either be self-supporting or solely collapsed very easily in a minimum amount of time.

Yet a further object of the present invention is to provide an improved tire curing rim structure having separate halves arranged for independent movement in the direction of the axis of a tire with improved means interposed between such separate halves which engages the air bag properly regardless of the positions of such halves.

Yet a further object of the present invention is to provide an improved tire curing rim structure wherein forces exerted on the rim structure by the inflated air bag are transferred to the mold structure in an improved manner to reduce the likelihood of objectionable deformation of such rim structure which would otherwise be produced as if, for example, the inward extending ends of such rim structure were supported as a cantilever.

Still, a further object of the present invention is to provide improved tire curing rim structures having relatively movable parts or self-adjustable under the influence of pressure exerted thereon by the bag to positions wherein forces are transferred from the bag to the outside mold structure whereby the likelihood of deformation of such rim structure is greatly reduced.

Yet a further object of the present invention is to provide an improved tire curing rim structure which is light weight, fully collapsible and fully adjustable in width and which may be used with air bags of different cross-sections in relationship to the cross-section of the encircling tire arranged in position for retreading.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a cross-sectional view through a mold with a tire therein for a retreading operation using the apparatus shown therein embodying the present invention.

Figure 2 is a sectional view taken substantially on the line 2—2 of Figure 1 showing only the tire curing rim structure embodying the present invention.

Figure 3 is a view taken substantially in the direction indicated by the line 3—3 in Figure 2.

Figure 4 is a perspective view showing in enlarged form the normally abutting ends of a portion of the rim structure separated one from the other.

Figure 5 is a view in side elevation of the tire curing rim structure embodying the present invention, partly fragmented and with the rim structure in fully expanded position.

Figure 6 is a view in side elevation of one of the rim halves shown in Figure 5 in fully collapsed condition.

Figures 7 and 8 are sectional views taken respectively on lines 7—7 and 8—8 of Figure 5.

Figure 9 is a sectional view taken substantially on the line 9—9 of Figure 8.

In the assembly shown in Figure 1, a tire casing 10 in a range of sizes is disposed within a conventional tire of two-part mold 11, 12 within which are recessed, respectively, matrices 13 and 14 and through which heating fluid, such as steam, passes through corresponding conduits 15, 16 therein. The lower matrix 14 may be secured to the lower mold half 12 by bolts 18 while the upper matrix 13 may be free to move within its upper mold half 11.

Structural features of the mold 11, 12 and matrices 13 and 14 may take different forms and shapes as is well understood in this art and for example, the present invention may likewise be embodied in either a permanent mold construction wherein the matrices are engraved in the casting of the heaters similar to heaters 11, 12 or the matrices 13, 14 may likewise be removably positioned in molds of a single heater type.

Further, in accordance with conventional practice, the tire 10 is pressed against the matrices 13, 14 by the air bag 20 which likewise may take different forms and shapes and as shown herein, has a cross-section made up of two oval shaped halves 20A, 20B of different curvature joined at adjacent ends at 20C, 20D in close proximity to a vertical line 21 drawn through the center of the tire 10. The tire rim structure embodying important features of the present invention is arranged to contact the arcuate oval shaped portion 20B of the bag and is pressed inside the truck tire between the two adjacent annular beads 23, 24 of the tire to maintain the inflated tube 20 or so-called bag within the confines of the tire during the rubber curing interval. This curing rim comprises three elements, an upper annular collapsible ring 25 and an adjacent similar annular ring 26, the spacing between the members 25 and 26 being bridged by the third member which is a spring steel band 28 recessed in adjacent parts of the members 25 and 26.

A characterizing feature of the composite curing rim structure 25, 26, 28, as described in more detail later, is that each one of the two rings 25, 26 have pivoted segments to render them fully collapsible for quick and convenient insertion and removal of the rim structure from in and from within the tire 10.

Rings 25, 26 have respectively radially outer ends 25A, 26A terminating at the bag portions 20C and 20D whereby the forces exerted thereon due to the pressure within the bag 20 serve to move the rim halves 25, 26 about and with such ends 25A, 26A, each sandwiched between the bag 20 on the one hand and the corresponding matrix 13, 14 on the other hand with the carcass of the tire interposed between such matrices and such ends 25A, 26A, in which case there is substantially no unbalanced force upon such ends 25A, 26A tending to deform them which would otherwise be the case if the rim halves 25, 26 were joined together, thereby making such ends 25A, 26A free ends of a cantilever structure.

Thus, since such ends 25A, 26A are relatively movable, there is a minimum of unbalanced forces on such ends and of greater importance, the composite rim structure is self-adjustable as to width, or in the vertical direction in Figure 1. These two relatively movable rim halves 25, 26 are normally spaced from one another by the air space 30 and for that reason the steel strap 28 bridging such halves 25, 26 is provided to firmly engage and maintain the bag portion 20B in its intended shape.

The flexible steep strip 28 has one of its ends terminated in a V-shaped notch 28A adapted to receive the V-shaped integrally formed projection 28B on the other end. A guide plate 28C is affixed in position, for example, by welding, brazing and the like under the notched portion 28A of the strip to serve as a combination guide and retaining member for the other V-shaped end 28B. It is apparent from the disclosure in Figure 4 that the steel band 28 may thus be curved to form rings of adjustable diameter with the V-shaped end 28B cooperating with the V-shaped notch 28A to maintain the abutting ends of the strip 28 in aligned position and with the member 28C welded thereon retaining the end 28B from moving outwardly. This strip 28, as shown in Figure 5, is apertured at 28E for the passage therethrough of the conventional valve stem on bag 20. Each rim half 25, 26 comprises eight arched segments 25E, 26E with adjacent ends thereof pivotally connected on corresponding pins 36, 37 extending in the manner shown in Figures 8 and 9. Pin 36 extends through and joins the groove defining members 38, 39 on one member 26E with the tongue member 40 on the adjacent member 26E, the pin 36 being prevented from moving in its longitudinal direction by a fastening pin 42 passing through a groove in pin 36 with the ends of the retaining pin 42 frictionally held in the retrial hole 44 in tongue member 40. These retaining pins 42 may be driven out of the trial holes 44 if desired to remove them whereby the pin 36 may in turn be removed to allow adjacent segments 26E to be disconnected.

As shown in Figure 5, the inner wall portion of rim halves 25, 26 are curved as indicated at 25G to allow passage therethrough of the valve stem of the bag 20. These clearance grooves 25G and the corresponding clearance groove (not shown) in rim half 26, are so disposed that the pins 36, 37 respectively joining the segments of a rim half 25, 26 are staggered thereby giving greater strength to the composite hinged structure.

It is apparent that the apparatus disclosed is well adapted to accommodate tires of varying sizes, there being some adjustment provided by the annular spacers 140 which may be of variable thickness and by the self-adjusting feature of the rim structure 25, 26, 27 and 28. Thus, if a larger tire than that one shown in Figure 1 is to be retreaded, the particular spacer 140 shown therein is removed and a spacer of greater thickness is inserted between the matrices 13, 14. In such case, when the bag 20 is properly inflated to its prescribed pressure, the rim halves 25, 26 are moved about to again contact the inner wall of the tire which we have assumed to be of larger width.

Preferably, as shown in Figures 7 and 8, the ends 25A, 26A of rim halves 25, 26 have flat surfaces 25E and 26E respectively thereon to contact the inner side wall on an extending area, thereby minimizing the likelihood of damage to the inner tire wall. It is apparent that the rim structure is adaptable for use with bags 20 of different cross-sectional configurations. For example, the joining portions 20C and 20D may be further to the left or right in Figure 1 in which case the ends of the rim halves 25, 26 will extend further inwardly or outwardly out of the tire as the case may be.

In order to facilitate removal of the tire after a curing operation when such tire tends to remain stuck in the matrix, there are preferably two extractor lugs (not shown), one each on upper rim half 25 and on lower rim half 26 which may be apertured for the insertion therethrough of a lifting hook, in accordance with conventional practice.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a tire retreading apparatus, a tire curing rim structure comprising a pair of collapsible rim structures, each structure comprising a plurality of pivoted segments arranged for disposition within a tire for movement with respect to one another during the time heat is being applied to the tire in the tire retreading operation, each structure being grooved on its outer periphery so as to define together a single recess, a flexible strip floatingly mounted within said recess for bridging the gap between the structures when they are separated, said strip extending around the entire circumference of both of said rim structures and having freely movable complementary circumferential ends.

2. In apparatus of the character described, a tire curing rim structure comprising a pair of collapsible rim structures, each pair comprising a plurality of pivoted segments movable to adjusted positions in accordance with the width of a tire during the time heat is being applied to the tire in the tire retreading operation, each structure being grooved on its outer periphery so as to define together a single recess, a flexible strip floatingly mounted within said recess for bridging the gap between the structures when they are separated.

3. In apparatus of the character described, a tire curing rim structure comprising a pair of collapsible ring structures, each comprising a plurality of pivoted segments mounted for pivotal movement on pivot pins, said pair of ring structures each having a cooperating groove to allow the passage therethrough of a valve stem, the axes of the pivot pins of one of said pair of ring structures being displaced with respect to the axes of the pivot pins of the other ring structure when said cooperating grooves are positioned for the passage of a valve stem therethrough.

4. In apparatus of the character described wherein an inner air bag is used to press a tire against an outer matrix, a tire curing rim structure comprising a pair of collapsible ring structures relatively movable with respect to one another to adjust themselves for tires of different widths, the radially outer end of each one of said pair of ring structures being sufficiently long to extend midway up into the tire to a position between said air bag and said outer matrix, and being adapted to contact the inner wall of said tire on an extended area so that such radially outer ends tend to be compressed between said inner air bag and said outer matrix to thereby minimize the presence of cantilever forces on said rim structure, the pair of ring structures being maintained free to move axially away from one another under the influence of the compression forces exerted by said bag on said outer ends to redistribute stresses such as to further minimize the presence of such cantilever forces, each ring structure being grooved on its outer periphery so as to define together a single recess, and a flexible strip floatingly mounted within said recess for bridging the gap between the ring structures when they are separated.

5. In apparatus of the character described, a tire curing rim structure comprising a pair of collapsible ring structures, each ring structure comprising a plurality of pivoted segments, each ring structure being grooved on its outer periphery so as to define together a single recess, a flexible strip floatingly mounted within said recess for bridging the gap between the ring structures when they are separated, said flexible strip having its complementary circumferential ends respectively terminating in a V-shaped notch and a cooperating V-shaped projection.

6. In apparatus of the character described, an annular heater, a spacer, a matrix comprising two separate halves mounted within said heater and maintained in adjusted position with respect to one another by said spacer of predetermined thickness disposed between said matrix halves, and a collapsible rim structure comprising a plurality of pivoted sections arranged for disposition within a tire accommodated by said matrix halves so spaced, said rim structure comprising a pair of collapsible ring structures adapted for relative movement with respect to one another during the time when heat is being applied to the tire in the tire curing operation to automatically adjust themselves for tires of different widths, each ring structure being grooved on its outer periphery so as to define together a single recess, a flexible strip floatingly mounted within said recess for bridging the gap between the structures when they are separated, said strip extending around the entire circumference of both of said ring structures and having freely movable complementary circumferential ends.

NORMAN G. HOVLID.
GEORGE B. BREAKEY.

REFERENCES CITED

The following references are of record in the file of this patent:

UNITED STATES PATENTS

| Number | Name | Date |
|---|---|---|
| 1,579,518 | Connelly | Apr. 6, 1926 |
| 1,643,493 | Gregg | Sept. 27, 1927 |
| 1,703,970 | Thorsen | Mar. 5, 1929 |
| 1,786,291 | Denmire | Dec. 23, 1930 |
| 2,372,246 | Bacon, Jr. | Mar. 27, 1945 |
| 2,513,482 | Heintz | July 4, 1950 |